(12) United States Patent
Elser et al.

(10) Patent No.: US 6,230,839 B1
(45) Date of Patent: May 15, 2001

(54) POWER STEERING WITH HYDRAULIC POWER ASSISTANCE

(75) Inventors: Dieter Elser, Essingen; Andreas Braun; Wolfgang Zeitz, both of Schwäbisch Gmünd, all of (DE)

(73) Assignee: Zf Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/403,697
(22) PCT Filed: Apr. 18, 1998
(86) PCT No.: PCT/EP98/02301
 § 371 Date: Oct. 25, 1999
 § 102(e) Date: Oct. 25, 1999
(87) PCT Pub. No.: WO98/49043
 PCT Pub. Date: Nov. 5, 1998

(30) Foreign Application Priority Data

Apr. 26, 1997 (DE) .............................................. 197 17 796

(51) Int. Cl.[7] .......................................................... B62D 5/06
(52) U.S. Cl. ............................................. 180/417; 180/441
(58) Field of Search ................................... 180/417, 422, 180/423, 421, 429, 441, 442

(56) References Cited

U.S. PATENT DOCUMENTS

| 4,457,390 | * | 7/1984 | Abe et al. ............................. 180/142 |
| 4,825,751 | * | 5/1989 | Kervagoret ............................. 91/420 |
| 4,940,105 | * | 7/1990 | Matsunaga et al. ................. 180/133 |
| 5,086,687 | * | 2/1992 | Elser et al. ........................ 91/375 A |
| 5,513,720 | * | 5/1996 | Yamamoto et al. ................. 180/141 |

\* cited by examiner

Primary Examiner—Anne Marie Boehler
Assistant Examiner—Tony Winner
(74) Attorney, Agent, or Firm—Larson & Taylor PLC

(57) ABSTRACT

In connection with a servo-assisted steering system with hydraulic servo-assistance for motor vehicles, a steering shaft (15), which is provided with a steering wheel (16), is connected via a torsion spring (14) with an input member of a steering gear (2). An output member of the steering gear (2) is connected with the wheels (11) of the vehicle which are to be steered. In case of a relative rotation of the steering shaft (15) in respect to the input member, two work chambers (12, 13) of a servo motor of a force amplification device can be pressurized by a servo pump via a steering valve with a pressure medium. Two sensors (23, 24) for detecting a rotation angle and/or a torque are arranged on the steering shaft (15), or respectively on the output member of the steering gear (2). After the steering wheel (16) is released following a steering process, the wheels to be steered (11) and the steering gear (2) can be returned with hydraulic assistance. The amount and the direction of the hydraulic servo-assistance, as well as the return of the wheels (11) to be steered, are controlled by means of a common electronically-controlled electromagnetic (18) valve.

19 Claims, 2 Drawing Sheets

POWER STEERING WITH HYDRAULIC POWER ASSISTANCE

BACKGROUND OF THE INVENTION

The invention relates to a servo-assisted steering system with hydraulic servo-assistance for motor vehicles. Here, a steering shaft, which is provided with a steering wheel, is connected via a torsion spring with an input member of a steering gear. An output member of the steering gear is connected with the wheels of the vehicle which are to be steered. In case of a relative rotation of the steering shaft in respect to the input member, two work chambers of a servo motor of a force amplification device can be pressurized by a servo pump via a steering valve with a pressure medium. At least one sensor for detecting a rotation angle and/or a torque is arranged on the steering shaft. A sensor for detecting a steering angle is arranged on the output member of the steering gear. This sensor can also be integrated into the rotation angle sensing mechanism of the steering shaft. A returning device is used for the hydraulic assistance of the returning of the steering gear and the wheels to be steered after the steering wheel is released following a steering process.

Such a servo-assisted steering system is known from EP 0 440 63 8 B1. In this case an electric motor used to affect the reaction force, which can be noted on the steering wheel, as a function of various parameters, is arranged in addition to a complete servo-assisted steering system with hydraulic servo-assistance. Moreover, the electric motor is used to center the steering valve exactly in its center. Finally, it is possible to achieve a hydraulic steering axle return in that, following the release of the steering wheel, the steering valve is displaced past its neutral position into a steering position, which corresponds to a reversal of the steering direction. A steering system is known from U.S. Pat. No. 4,745,985, which contains several features of the invention. With this steering system the amount and the direction of the hydraulic servo-assistance, as well as the return of the wheels to be steered, are controlled by means of a common electronically-controlled electromagnetic valve. Steering errors could appear in case of the possible appearance of a malfunction in the electronic control device, which could lead to endangerment.

BRIEF SUMMARY OF THE INVENTION

The object of the invention is based on realizing the positive properties present in the known servo-assisted steering system, such as the exact centering of the valve and the hydraulic steering axle return, by simpler means without the use of an electric motor. Moreover, the steering ability of the vehicle is to be assured if a malfunction in the electronic system occurs.

This object is attained with the servo-assisted steering system featured in that the amount and the direction of the hydraulic servo-assistance, as well as the return of the wheels to be steered are controlled by means of a common electronically-controlled electromagnetic valve which thus acts as a return device. The electromagnetic valve can be integrated into the actual servo-assisted steering system, or it can be arranged outside of it at any arbitrary place. The auxiliary power for the hydraulic servo-assistance is exclusively provided by the servo pump. No electric motor is required.

In order to prevent danger in case of a possibly occurring error, a bypass valve is arranged between the steering shaft and the input member of the steering gear. With other known servo-assisted steering systems the steering valve is located at this location. The bypass valve is designed as a rotary slide valve with a closed center, so that in its neutral position there is no possible connection between the two work chambers of the servo motor. Only when an error occurs is the bypass valve switched into its open position, so that the two work chambers of the servo motor are connected with each other. The two work chambers are then bypassed, so that no pressure buildup can take place in the servo motor. In this case the steering energy is exclusively provided by the mechanical actuation of the steering wheel.

Advantageous and useful embodiments of the invention are recited subsequently.

The electromagnetic valve can be controlled in a simple manner as a function of at least one parameter, for example the road speed of the vehicle, the steering speed, the yaw speed, the load of the vehicle, the acceleration of the vehicle and others.

By means of an appropriate programming of the electronic unit and appropriate sensor devices it is possible to control the electromagnetic valve by means of signals, which provide information regarding the present position of the vehicle and regarding desired future positions. With this, the option for automatic steering is contained in the servo-assisted steering system.

BRIEF DESCRIPTION OF THE DRAWINGS

The invention will be explained in greater detail in what follows by means of two exemplary embodiments represented schematically in FIGS. 1 and 2.

DETAILED DESCRIPTION OF THE INVENTION

Figure 1:
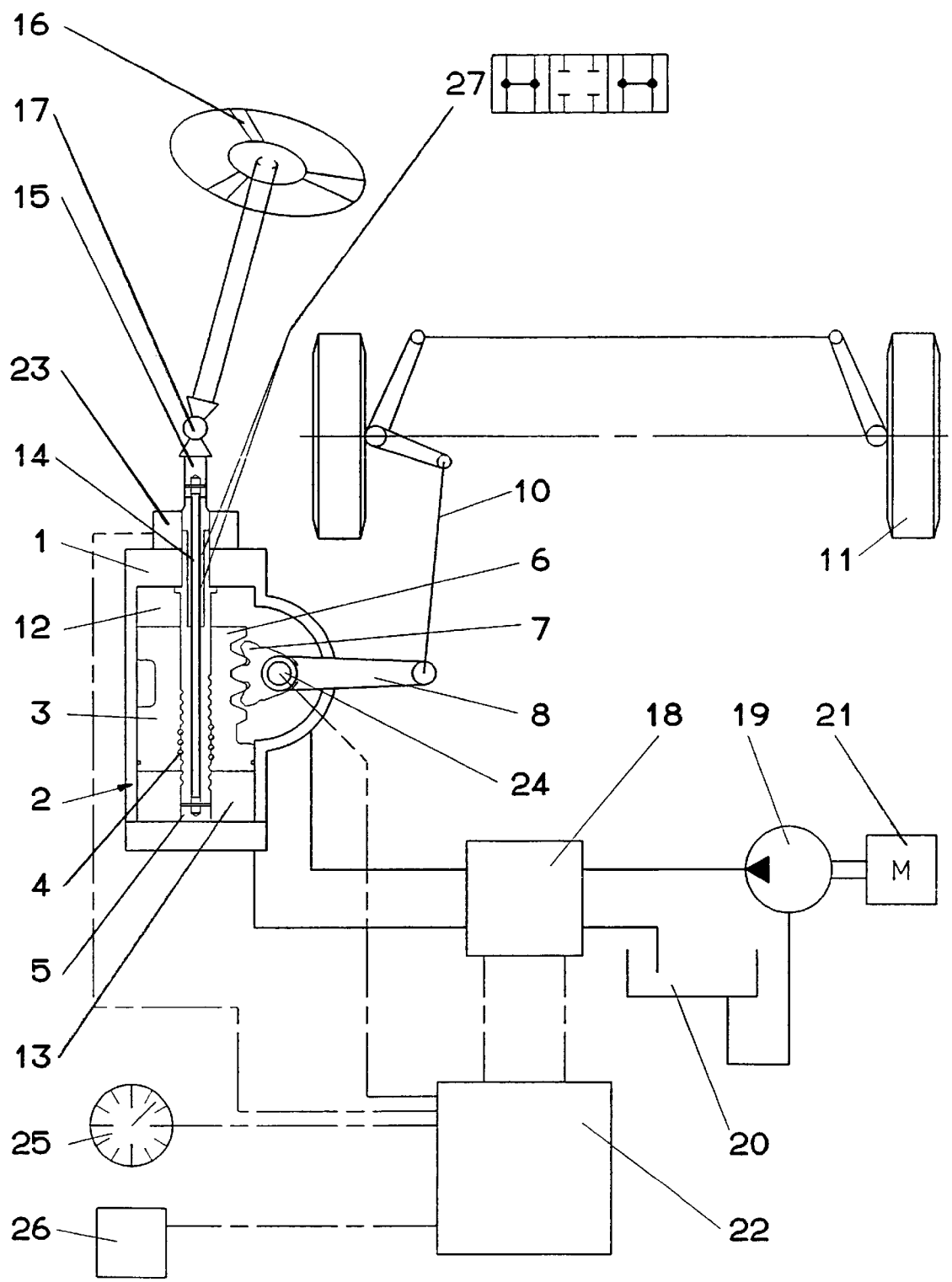

The invention will be explained by means of an example of a ball and nut servo-assisted steering system. However, the invention can be applied with the same effect to a rack and pinion servo-assisted steering system.

A steering gear 2 in a steering housing 1 contains a work piston 3, which is drivingly connected via a series of balls 4 with a threaded spindle 5, and via teeth 6 with a sector shaft 7. Here, the threaded spindle 5 constitutes an input member of the steering gear 2, and the sector shaft 7 an output member of the steering gear 2.

There is a connection from the sector shaft 7 via a drop arm 8 and steering linkage 10 with at least two wheels 11 of the motor vehicle which are to be steered.

The housing 1 forms two cylindrical work chambers 12 and 13, which are separated from each other by the work piston 3.

The threaded spindle 5 as the input member of the steering gear 2 is connected with a steering shaft 15 having a steering wheel 16, by means of a torsion spring 14. The steering shaft 15 can be divided by a cross joint 17.

By means of an electromagnetic valve 18, for example a proportional valve, the two work chambers 12 and 13 can be pressurized with a pressure medium, which a servo pump 19 conveys from a reservoir 20. The servo pump 19 is driven, for example, by a vehicle engine 21, or an electric motor.

The electromagnetic valve 18 can be designed with an open or a closed center. In case of a design with a closed center, a pressure medium reservoir, not represented, is provided in addition to the servo pump 19.

The electromagnetic valve 18 is regulated by means of an electronic unit 22. The electronic unit 22 receives signals from at least one first sensor 23, arranged on the steering shaft 15, for detecting a rotation angle and/or a torque. A second sensor 24 for detecting a steering angle is arranged on the output member, the sector shaft 7, of the steering gear 2 and provides the appropriate signals to the electronic unit 22. The sensor can also be arranged with the same effect on the input member of the steering gear 2. Further signals, which relay parameters of the respective state of the vehicle, are provided to the electronic unit 22, for example from an electronic speedometer 25 and a yaw speed sensor 26.

In the exemplary embodiment in accordance with FIG. 1, a bypass valve 27 has been inserted between the steering shaft 15 and the input member of the steering gear 2, i.e. the threaded spindle 5. The bypass valve 27 is embodied as a rotary slide valve with a closed center. This is symbolically indicated in FIG. 1. In case of a relative rotation between the steering shaft 15 and the threaded spindle 5, during which the torsion spring 14 is turned as a function of the steering moment applied, the bypass valve 27 can open at an actuating force of slightly less than 450 N. In accordance with an EEU Guideline, such an actuating force is permissible when an error occurs in a servo-assisted steering system. This bypass valve 27 is mechanically actuated, similar to a rotary slide valve of a "normal" servo-assisted steering system, and is therefore very dependable. The work chambers 12 and 13 are connected with each other by the opening of the bypass valve 27, so that no pressure buildup can take place in the work chambers 12 and 13 of the steering gear 2. In this case the steering gear is exclusively operated by the manual force at the steering wheel.

The servo-assisted steering system can be laid out for automatic steering by means of the appropriate programming of the electronic unit 22. It is possible to transmit signals from a guide device, not represented, arranged outside of the vehicle, to the electronic unit 22. The guide device can be equipped with an induction cable in the road, for example. A video orientation or a satellite control is also possible. The signals provide information regarding the present position and regarding desired future positions. The command value/actual value deviation is then detected by the electronic unit 22 and appropriately corrected steering commands are then passed on to the electromagnetic valve 18. The driver can turn off the automatic steering by action on the steering wheel 16.

Figure 2:
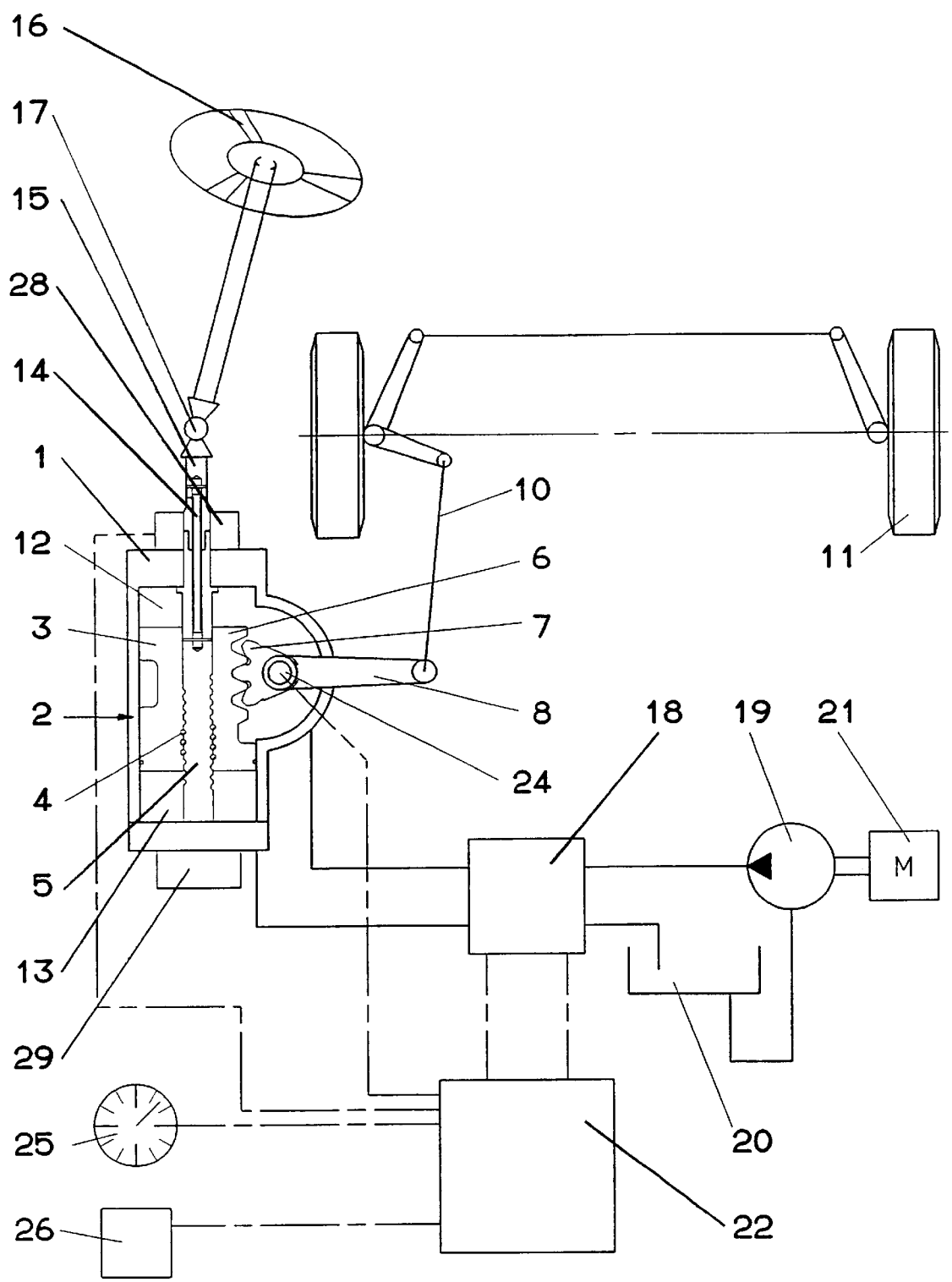

With the second exemplary embodiment in accordance with FIG. 2, the bypass valve is integrated into the electromagnetic valve 18. In this case, the bypass valve can be electronically controlled together with the electromagnetic valve 18.

In this exemplary embodiment, the first sensor is embodied as angle sensor 28. A further angle sensor 29 is installed at the lower end of the steering housing 1, coupled with the threaded spindle 5. By means of this further angle sensor 29 it is possible to improve the angular resolution of the second sensor 24 arranged on the sector shaft 7.

The remaining components of the second exemplary embodiment correspond to those in the first exemplary embodiment, and are identified by the same reference numerals.

A steering movement by means of the steering wheel 16 is detected by the angle sensor 28 at the steering shaft 15. The steering movement is passed on from the steering shaft 15 via the torsion spring 14, which in the process is turned as a function of the actuation moment. On its other side the torsion spring 14 is firmly connected with the threaded spindle 5.

Turning of the torsion spring 14 causes a change of the relation of the upper angle sensor 28 in respect to the second sensor 24 on the sector shaft 7. This relative angular change is evaluated by the electronic unit 22. The electronic unit 22 then guides an oil flow with the correct rotation from the pump 19 via the electromagnetic valve 18 to the appropriate work chamber 12, or respectively 13. Since the second sensor 24 on the sector shaft 7 has a total angular deflection of only approximately 90 degree, and therefore the resolution of the sensor is relatively imprecise, it would be necessary to install a step-up gear upstream of it. The angle sensor 29, which rotates together with the threaded spindle 5, takes the place of such an expensive step-up gear.

The two angle sensors 28 and 29, as well as the first and the second sensors 23, 24 at the sector shaft 7, and the electronic unit 22 are redundantly designed. By means of the redundancy in the area of the sensor and the electronic unit it is possible to detect errors and to deactivate the hydraulic servo-assistance of the steering gear 2 by means of the electronically controllable bypass valve integrated into the electromagnetic valve 18.

What is claimed is:

1. A servo-assisted steering system with hydraulic servo-assistance which is used for motor vehicles, comprising:

a steering shaft which is provided with a steering wheel, said steering shaft being connected via a torsion spring with an input member of a steering gear, an output member of the steering gear which is connected with wheels of the vehicle which are to be steered, two work chambers of a servo motor of a hydraulic servo-assistance device which are pressurized by a servo pump via a steering valve when there is a relative rotation of the steering shaft with respect to the input member, at least one first sensor for detecting one of a rotation angle or a torque which is arranged on the steering shaft, a second sensor for detecting a steering angle which is arranged on one of the output member or the input member, a returning device for returning the steering gear and the wheels to be steered to a predetermined position after the steering wheel is released following a steering process, a common electronically-controlled electromagnetic valve which controls the amount and the direction of the hydraulic servo-assistance as well as the return of the wheels to be steered, and a bypass valve which is arranged between the steering shaft and the input member of the steering gear.

2. The servo-assisted steering system as claimed in claim 1, wherein the bypass valve is a rotary slide valve with a closed center.

3. The servo-assisted steering system as claimed in claim 2, wherein in an opened position of the bypass valve the two work chambers of the servo motor are connected with each other.

4. The servo-assisted steering system as claimed in claim 1, wherein the bypass valve is a safety valve which is mechanically actuable.

5. The servo-assisted steering system as claimed in claim 1, wherein the electromagnetic valve is controlled by an electronic unit as a function of at least one parameter of the vehicle.

6. The servo-assisted steering system as claimed in claim 1, wherein the electromagnetic valve is controlled by an electronic unit as a function of signals which provide information regarding the present position of the vehicle and desired future positions.

7. The servo-assisted steering system as claimed in claim 6, wherein the signals are transmitted to the electronic unit of the vehicle by a guide device arranged outside of the vehicle.

8. The servo-assisted steering system as claimed in claim 1, wherein the electromagnetic valve is a valve with a closed center.

9. The servo-assisted steering system as claimed in claim 1, wherein the bypass valve is integrated in an electronically controllable manner into the electromagnetic valve.

10. The servo-assisted steering system as claimed in claim 9, wherein, in addition to the first sensor, a further third sensor for detecting one of a rotation angle or a torque is arranged at the input member of the steering gear.

11. The servo-assisted steering system as claimed in claim 1, wherein the first and second sensors and the electronic unit are made redundant.

12. The servo-assisted steering system as claimed in claim 1, wherein the electromagnetic valve is a proportional valve.

13. The servo-assisted steering system as claimed in claim 3, wherein the bypass valve is a safety valve which is mechanically actuable.

14. The servo-assisted steering system as claimed in claim 13, wherein the electromagnetic valve is controlled by an electronic unit as a function of at least one parameter of the vehicle.

15. The servo-assisted steering system as claimed in claim 14, wherein the at least one parameter is selected from steering speed, yaw speed, or a load of the vehicle.

16. The servo-assisted steering system as claimed in claim 14, wherein the electromagnetic valve is controlled by an electronic unit as a function of signals which provide information regarding the present position of the vehicle and desired future positions.

17. The servo-assisted steering system as claimed in claim 14, wherein the electromagnetic valve is a valve with a closed center.

18. The servo-assisted steering system as claimed in claim 17, wherein the first and second sensors and the electronic unit are made redundant.

19. The servo-assisted steering system as claimed in claim 18, wherein the electromagnetic valve is a proportional valve.

* * * * *